US 9,896,183 B2

United States Patent
Shortt, Jr. et al.

(10) Patent No.: US 9,896,183 B2
(45) Date of Patent: Feb. 20, 2018

(54) AIRFRAME COMPONENT WITH ELECTRICALLY BONDED CONNECTIONS

(71) Applicant: Sikorsky Aircraft Corporation, Stratford, CT (US)

(72) Inventors: Robert F. Shortt, Jr., Milford, CT (US); Thomas R. Agria, Milford, CT (US); Karl Ulsamer, West Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 326 days.

(21) Appl. No.: 14/816,882

(22) Filed: Aug. 3, 2015

(65) Prior Publication Data

US 2016/0052615 A1    Feb. 25, 2016

Related U.S. Application Data

(60) Provisional application No. 62/041,373, filed on Aug. 25, 2014.

(51) Int. Cl.
*B64C 1/14* (2006.01)
*H01Q 1/28* (2006.01)
*H01Q 1/44* (2006.01)

(52) U.S. Cl.
CPC ............ *B64C 1/14* (2013.01); *H01Q 1/286* (2013.01); *H01Q 1/44* (2013.01)

(58) Field of Classification Search
CPC ........ B64C 1/14; B64C 1/1407; H01Q 1/286; H01Q 1/281; H01Q 1/325; H01Q 1/38; H01Q 1/44
See application file for complete search history.

(56) References Cited

U.S. PATENT DOCUMENTS

| | | | |
|---|---|---|---|
| 5,123,985 A | 6/1992 | Evans | |
| 5,688,353 A | 11/1997 | Dublinski | |
| 6,638,466 B1 | 10/2003 | Abbott | |
| 7,837,148 B2 | 11/2010 | Kismarton | |
| 8,640,590 B2 | 2/2014 | Holowczak | |
| 8,662,449 B2 | 3/2014 | Shah | |
| 2008/0164373 A1 | 7/2008 | Roming | |
| 2010/0252682 A1 | 10/2010 | Pahl | |
| 2011/0095951 A1* | 4/2011 | McCarthy | H01Q 1/28 343/705 |
| 2013/0032660 A1 | 2/2013 | Wolf | |
| 2015/0325906 A1* | 11/2015 | Lerchner | H01Q 1/3275 343/713 |

* cited by examiner

*Primary Examiner* — Benjamin P Lee

(74) *Attorney, Agent, or Firm* — Cantor Colburn LLP

(57) ABSTRACT

An airframe component is provided and includes first and second components having respective first and second opposite surfaces and edge portions, the first component defining a plane and the second component being attachable to the first surface of the first component as a protrusion from the plane, a first conductive layer disposed to wrap around the edge portion of the first component from the first surface to the second surface, a second conductive layer disposed on the first surface of the second component to extend beyond the edge portion and an insulation layer interposable between the first and second conductive layers and between a periphery of the first surface of the second component and the second conductive layer.

15 Claims, 3 Drawing Sheets

AIRFRAME COMPONENT WITH ELECTRICALLY BONDED CONNECTIONS

FEDERAL RESEARCH STATEMENT

This invention was made with government support with the United States Navy under Contract No. N00019-03-C-0011. The government has certain rights in this invention.

CROSS REFERENCE TO RELATED APPLICATION

This application is a Non-Provisional of U.S. Provisional Application No. 62/041,373 filed Aug. 25, 2014 the disclosures of which are incorporated by reference herein in its entirety.

BACKGROUND OF THE INVENTION

The subject matter disclosed herein relates to an airframe component and, more particularly, to an airframe component with electrically bonded connections.

In some aircraft, such as certain types of helicopters, the airframe includes a door (or nose door) that has an outer surface designed to be used as an antenna or as an extension of an antenna. To achieve this, the door is painted with a paint mixture including electrically conductive materials such that the paint itself is a viable electrical conductor and is thus able to transmit and receive certain types of signals.

However, it was found that the conductive paint was or included known carcinogens. As such, the option to use conductive paint to provide for the antenna or antenna extension was removed from consideration.

BRIEF DESCRIPTION OF THE INVENTION

According to one aspect of the invention, an airframe component is provided and includes first and second components having respective first and second opposite surfaces and edge portions, the first component defining a plane and the second component being attachable to the first surface of the first component as a protrusion from the plane, a first conductive layer disposed to wrap around the edge portion of the first component from the first surface to the second surface, a second conductive layer disposed on the first surface of the second component to extend beyond the edge portion and an insulation layer interposable between the first and second conductive layers and between a periphery of the first surface of the second component and the second conductive layer.

In accordance with additional or alternative embodiments, the first and second components each include curable composite materials.

In accordance with additional or alternative embodiments, the first component includes a door panel and the second component includes a door jamb.

In accordance with additional or alternative embodiments, the first and second conductive layers each include an electrically conductive wire mesh.

In accordance with additional or alternative embodiments, the insulation layer includes at least one or more of Fluorinated ethylene propylene (FEP) and Polytetrafluoroethylene (PTFE).

In accordance with additional or alternative embodiments, the first and second conductive layers are contactable with the second component attached to the first surface of the first component.

According to another aspect of the invention, a method of forming an airframe component is provided and includes wrapping a first conductive layer around an edge portion of a first component defining a plane from a first surface thereof to a second surface thereof, disposing a second conductive layer on a first surface of a second component, which is attachable to the first component as a protrusion from the plane, to extend beyond an edge portion thereof, and interposing an insulation layer between the first and second conductive layers and between a periphery of the first surface of the second component and the second conductive layer.

In accordance with additional or alternative embodiments, the first and second components each include curable composite materials.

In accordance with additional or alternative embodiments, the first and second conductive layers each include an electrically conductive wire mesh.

In accordance with additional or alternative embodiments, the insulation layer includes at least one or more of Fluorinated ethylene propylene (FEP) and Polytetrafluoroethylene (PTFE).

In accordance with additional or alternative embodiments, the method further includes separately curing the first and second components.

In accordance with additional or alternative embodiments, the method further includes pulling back the second conductive layer from the periphery of the first surface of the second component and trimming the second component.

In accordance with additional or alternative embodiments, the method further includes bonding the second component to the first surface of the first component, removing the insulation layer and bonding the first conductive layer to the second conductive layer.

In accordance with additional or alternative embodiments, the bonding of the second component to the first surface of the first component includes autoclave co-curing.

In accordance with additional or alternative embodiments, at least the bonding of the first conductive layer to the second conductive layer includes applying conductive sealant between the first and second conductive layers.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, composite technology has been utilized to develop ply layup books for airframe components, such as helicopter doors. This involves embedding wire conductive mesh into the layup design on two separate halves of the airframe component (i.e., the door). The halves are then cured with CHO-mask tape and, once curing is complete, the tape can be removed and the two halves can be assembled together. The assembled halves can then be co-cured together in an autoclave.

Figure 1:
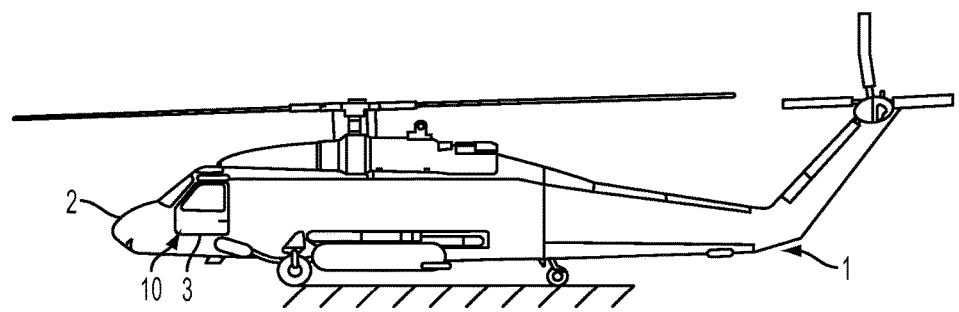
FIG. 1 is a side view of a helicopter in accordance with embodiments.
Figure 2:
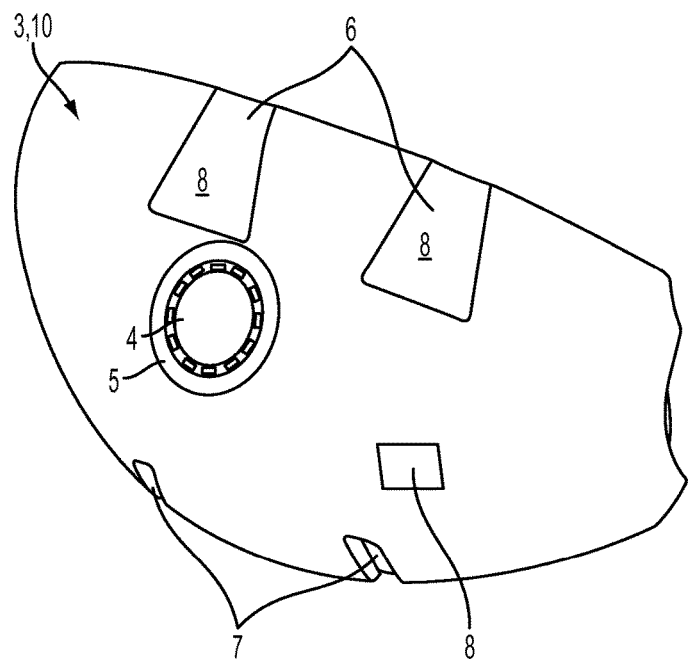
FIG. 2 is a perspective view of a helicopter door in accordance with embodiments.

With reference to FIGS. 1 and 2, an airframe component 10 is provided for use with an aircraft, such as a helicopter 1. The airframe component 10 may be configured for example as a door 3 at a nose portion 2 of the helicopter 1 that has an outer surface designed to be used as an antenna or as an extension of an antenna. Thus, the outer surface of the door 3 needs to be formed of an electrically conductive material that is coupled or otherwise adhered to a composite door material. In addition, the door 3 needs to include various door features, such as a window emplacement 4, a door jamb 5 that may be disposed around the window emplacement 4, hinge areas 6 and latch areas 7 disposed at a periphery of the door 3 and reinforcing ply areas 8, which may be formed of, for example, Kevlar™, at various positions.

Figure 3:
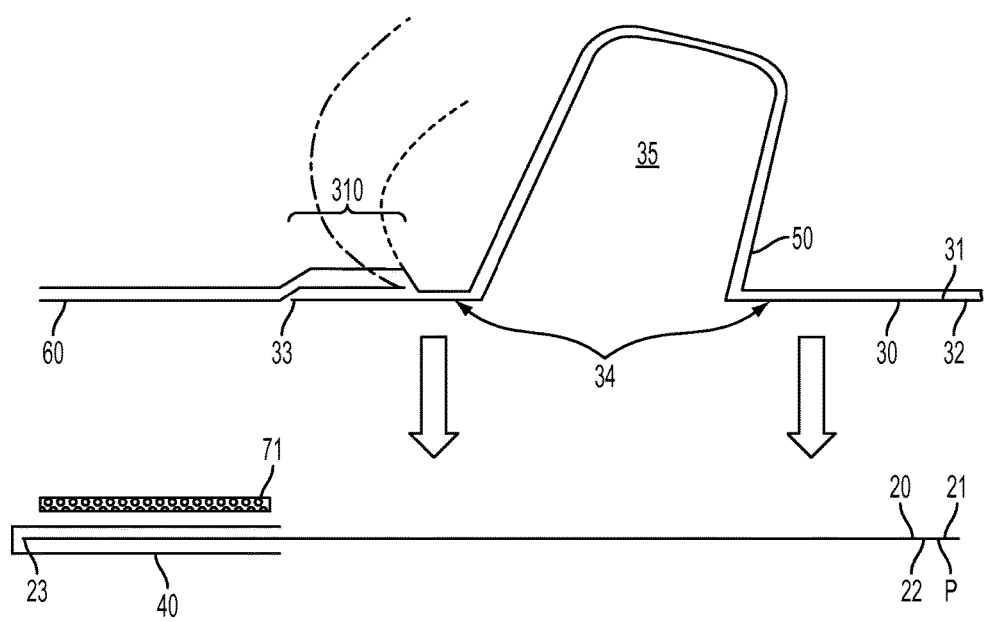
FIG. 3 is a schematic cross-sectional view of a portion of the door of FIG. 2 during an early assembly stage in accordance with embodiments.

With reference to FIG. 3, the airframe component 10 includes a first component 20 and a second component 30. The first component has a first surface 21, a second surface 22 opposite the first surface 21 and an edge portion 23 extending between complementary peripheries of the first and second surfaces 21 and 22. The first component 20 may be substantially planar in shape such that at least the first surface 21 defines a plane P and is flat. The second component 30 has a first surface 31, a second surface 32 opposite the first surface 31 and an edge portion 33 extending between complementary peripheries of the first and second surfaces 31 and 32. The second component 30 may include substantially planar portions 34 as well as a protrusion portion 35 and is attachable to the first component 20 such that the protrusion portion 35 protrudes or extends away from the plane P.

The configuration described above and further described below is particularly provided for in the case of the airframe component 10 being the door 3, the first component 20 being a door panel and the second component 30 or the protrusion portion 35 forming the door jamb 5. However, it is to be understood that various features of the door 3 or other areas of the helicopter 1 may be configured similarly.

The first component 20 may be formed of a curable composite material that can be independently molded and trimmed and then hardened by way of a curing process. In accordance with embodiments, the curing process can include heating or ultraviolet (UV) radiation exposure. The second component 30 may be formed of a curable composite material that can be independently molded and trimmed and then hardened by way of a curing process. In accordance with embodiments, the curing process can include heating or ultraviolet (UV) radiation exposure. The molding, trimming and hardening (curing) processes of the first component 20 may be conducted with or entirely separate from the molding, trimming and hardening (curing) processes of the second component 30.

Still referring to FIG. 3, the airframe component 10 further includes a first conductive layer 40, a second conductive layer 50 and an insulation layer 60. The first conductive layer 40 may be disposed to wrap around the edge portion 23 of the first component 20 from the first surface 21 to the second surface 22 and may be formed of a wire mesh of electrically conductive material. The second conductive layer 50 may be disposed on the first surface 31 of the second component 30 to extend beyond the edge portion 33 and may also be formed of a wire mesh of electrically conductive material.

The insulation layer 60 may be temporarily or removably interposable between the first conductive layer 40 and the second conductive layer 50 and between a periphery 310 of the first surface 31 of the second component 30 and the second conductive layer 50. The insulation layer 60 may include at least one or more of Fluorinated ethylene propylene (FEP), Polytetrafluoroethylene (PTFE) other similar non-stick materials or combinations thereof.

In accordance with embodiments and, as shown in FIG. 3, the second conductive layer 50 and the insulation layer 60 may be pulled back from the periphery 310 of the first surface 31 of the second component 50 due at least in part to the insulation layer 60 being formed of a non-stick material. With the second conductive layer 50 and the insulation layer 60 pulled back in this manner, the second component 50 can be trimmed or otherwise manipulated.

Figure 4:
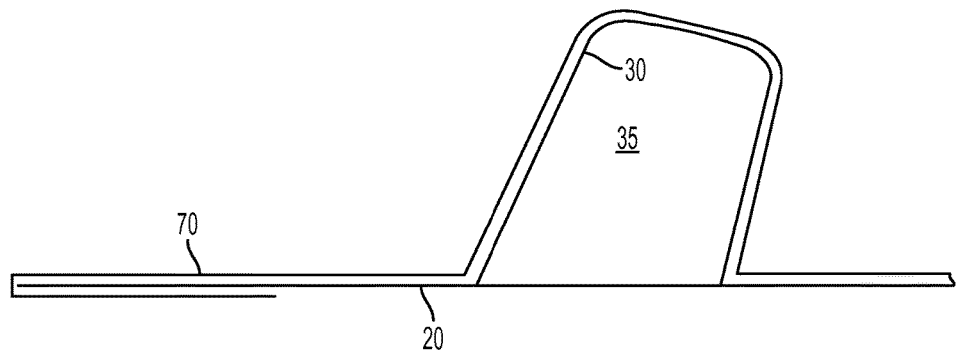
FIG. 4 is a schematic cross-sectional view of a portion of the door of FIG. 2 during a late assembly stage in accordance with embodiments.

With additional reference to FIG. 4, it is to be noted that while FIG. 3 illustrates that the first and second components 20 and 30 are initially separate from one another, FIG. 4 illustrates that the first and second components 20 and 30 are attached and bonded to one another during assembly of the airframe component 10. In particular, the substantially planar portions 34 of the second component 30 may be bonded to the first surface 21 of the first component 20 such that the protrusion portion 35 protrudes or extends away from the plane P. In this case, the insulation layer 60 can be removed such that the first and second conductive layers 40 and 50 are contactable with each other to form a continuous ground conductor 70 that extends from the second surface 22 of the first component 20, around the edge portion 23 and along the first surface 21 to the first surface 31 of the second component 30.

In accordance with embodiments, the bonding of the second component 30 to the first surface 21 of the first component 20 may include co-curing of the first and second components 20 and 30 in an autoclave or another similar device. In accordance with further embodiments, the first and second conductive layers 40 and 50 may be directly bonded with one another using a fastener or external adhesive or they may be adhesively bonded by way of a conductive sealant 71 (see FIG. 3). In the latter case, the conductive sealant 71 includes a plurality of spherical or fibrous conductors suspended within a resin or epoxy matrix.

Figure 5:
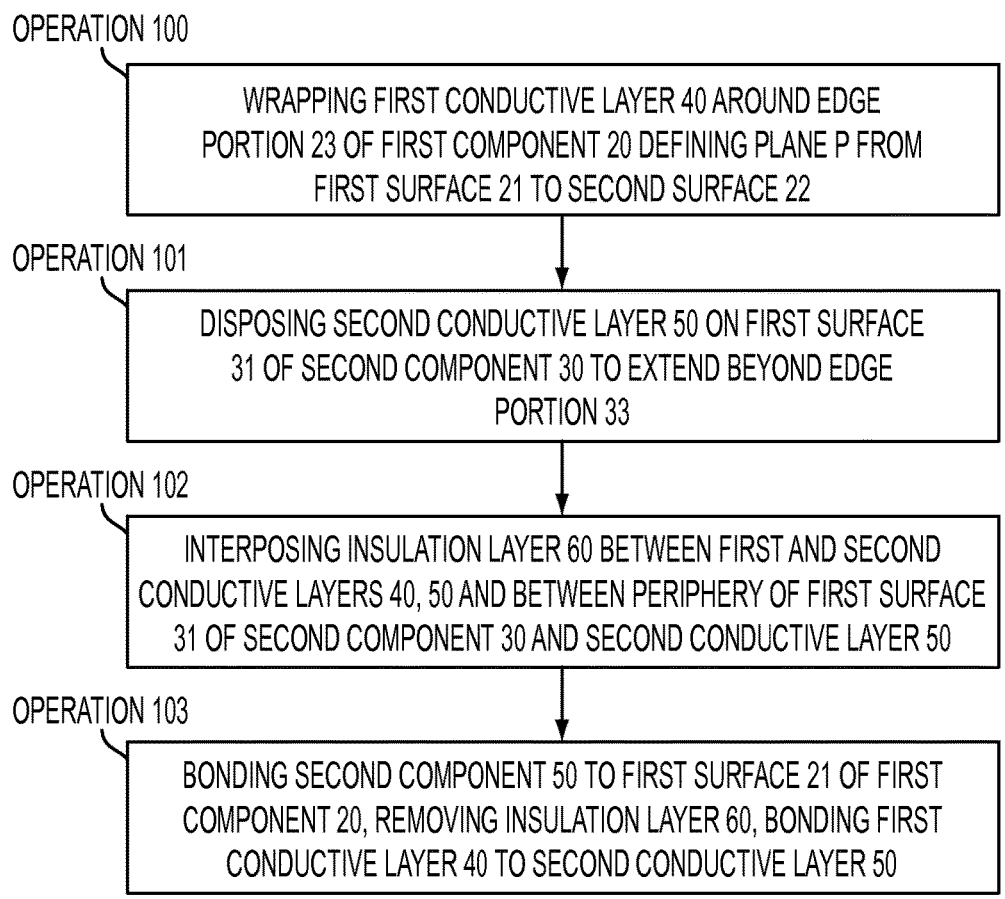
FIG. 5 is a flow diagram illustrating a method of forming an airframe component in accordance with embodiments.

With reference to FIG. 5, a method of forming the airframe component 10 is provided. The method includes wrapping the first conductive layer 40 around the edge portion 23 of the first component 20 defining the plane P from the first surface 21 to the second surface 22 (operation 100), disposing the second conductive layer 50 on the first surface 31 of the second component 30 to extend beyond the edge portion 33 (operation 101) and interposing the insulation layer 60 between the first and second conductive layers 40 and 50 and between the periphery 310 of the first surface 31 of the second component 30 and the second conductive layer 50 (operation 102). The method further includes bonding the second component 50 to first surface 21 of the first component 20, removing the insulation layer 60 and bonding the first conductive layer 40 to the second conductive layer 50 (operation 103).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An airframe component, comprising:
    first and second components having respective first and second opposite surfaces and edge portions,
    the first component defining a plane and the second component being attachable to the first surface of the first component as a protrusion from the plane;
    a first conductive layer disposed to wrap around the edge portion of the first component from the first surface of the first component to the second surface of the first component;
    a second conductive layer disposed on the first surface of the second component to extend beyond the edge portion of the second component; and
    an insulation layer interposable between the first and second conductive layers and between a periphery of the first surface of the second component and the second conductive layer.

2. The airframe component according to claim 1, wherein the first and second components each comprise curable composite materials.

3. The airframe component according to claim 1, wherein the first component comprises a door panel and the second component comprises a door jamb.

4. The airframe component according to claim 1, wherein the first and second conductive layers each comprise an electrically conductive wire mesh.

5. The airframe component according to claim 1, wherein the insulation layer comprises at least one or more of Fluorinated ethylene propylene (FEP) and Polytetrafluoroethylene (PTFE).

6. The airframe component according to claim 1, wherein the first and second conductive layers are contactable with the second component attached to the first surface of the first component.

7. A method of forming an airframe component, the method comprising:
    wrapping a first conductive layer around an edge portion of a first component defining a plane from a first surface thereof to a second surface thereof;
    disposing a second conductive layer on a first surface of a second component, which is attachable to the first component as a protrusion from the plane, to extend beyond an edge portion thereof; and
    interposing an insulation layer between the first and second conductive layers and between a periphery of the first surface of the second component and the second conductive layer.

8. The method according to claim 7, wherein the first and second components each comprise curable composite materials.

9. The method according to claim 7, wherein the first and second conductive layers each comprise an electrically conductive wire mesh.

10. The method according to claim 7, wherein the insulation layer comprises at least one or more of Fluorinated ethylene propylene (FEP) and Polytetrafluoroethylene (PTFE).

11. The method according to claim 7, further comprising separately curing the first and second components.

12. The method according to claim 7, further comprising:
    pulling back the second conductive layer from the periphery of the first surface of the second component; and
    trimming the second component.

13. The method according to claim 7, further comprising:
    bonding the second component to the first surface of the first component;
    removing the insulation layer; and
    bonding the first conductive layer to the second conductive layer.

14. The method according to claim 13, wherein the bonding of the second component to the first surface of the first component comprises autoclave co-curing.

15. The method according to claim 13, wherein at least the bonding of the first conductive layer to the second conductive layer comprises applying conductive sealant between the first and second conductive layers.

* * * * *